UNITED STATES PATENT OFFICE.

CARL THEODOR THORSSELL AND HARALD LUDVIG REINHOLD LUNDÉN, OF GOTTENBORG, SWEDEN.

PROCESS FOR THE PRODUCTION OF CALCIUM NITRATE.

1,286,839.  Specification of Letters Patent.  Patented Dec. 3, 1918.

No Drawing.  Application filed April 10, 1918. Serial No. 227,796.

*To all whom it may concern:*

Be it known that we, CARL THEODOR THORSSELL, a citizen of Sweden, residing at Södra Hamngatan 11, Gottenborg, Sweden, and HARALD LUDVIG REINHOLD LUNDÉN, a citizen of Sweden, residing at Södra Hamngatan 11, Gottenborg, Sweden, have invented certain new and useful Improvements in Processes for the Production of Calcium Nitrate, of which the following is a specification.

The transformation of ammonia or ammonium combinations into nitrates by oxidation by means of nitrificating bacteria in the presence of an alkali is already known. These bacteria abound in fertile garden soil.

It has become evident, however, that also cyanamid of calcium may be reacted upon to form nitrate of calcium by means of such nitrificating bacteria in the following manner: The cyanamid of calcium is dissolved in water or in water containing carbonic acid in order to neutralize possibly occurring oxid of calcium whereafter this solution is mixed with a solution of nitrate of calcium. The mixture thus obtained is used as liquid of nutriment, i. e., it is brought into an intimate contact with the bacteria carried by a suitable substratum (for instance soil mixed with powdered coke) during ample admittance of air, whereat the cyanamid of calcium is transformed into nitrate of calcium.

One tenth, for instance, of the finished solution of nitrate of calcium may to advantage be set aside for preparing the finished article, while the rest is mixed with fresh solution of cyanamid of calcium and then serves as fresh liquid of nutriment, etc., in order to get a high concentration of the solution, as the bacteria bear stronger solutions of nitrate of calcium than of cyanamid.

The process may be carried out in the following manner: A water solution containing 10 per cent. of nitrate of calcium and 0.5 per cent. of cyanamid of calcium is allowed to trickle through a layer of garden soil mixed with powdered coke. The velocity of flow is adapted to the oxidizing capacity of the bacteria, i. e., so that the cyanamid has time to become completely oxidized. The liquid after passing through the layer contains only nitrate of calcium. One tenth of the same is taken out and prepared to finished product. Solution of cyanamid of calcium is added to the rest of the liquid, so that the original concentration is maintained.

Having thus described our invention, what we claim as new and desire to secure by Letters Patent is:

1. The process for the production of nitrate of calcium from cyanamid of calcium, in which the cyanamid of calcium is dissolved in water and mixed with a solution of nitrate of calcium, whereafter the mixture is brought into intimate contact with nitrificating bacteria during ample supply of air.

2. The process for the production of nitrate of calcium from cyanamid of calcium, in which the cyanamid of calcium is dissolved in water and mixed with a solution of nitrate of calcium, whereafter the mixture is brough into intimate contact with nitrificating bacteria with an ample supply of air, a smaller part, for instance one tenth, of the solution of nitrate of calcium already oxidized being set aside for preparing the finished article, while the rest is mixed with fresh solution of cyanamid of calcium and used as fresh liquid of nutriment for the purpose of obtaining a stronger solution of nitrate which is the desired product.

In testimony whereof, we have signed our names to this specification in the presence of two subscribing witnesses.

CARL THEODOR THORSSELL.
HARALD LUDVIG REINHOLD LUNDÉN.

Witnesses:
ROBERT F. TOWNSEND,
SYLVESTER E. ROTHCHILDS.